United States Patent [19]

Chen

[11] Patent Number: 5,858,575
[45] Date of Patent: Jan. 12, 1999

[54] HOT DIPPED PB-CA GRIDS FOR LEAD-ACID BATTERIES

[75] Inventor: Yu-Lin Chen, Menomonee, Wis.

[73] Assignee: General Motors Corporation, Detroit, Mich.

[21] Appl. No.: 866,203

[22] Filed: May 30, 1997

[51] Int. Cl.[6] .................................................. H01M 4/73
[52] U.S. Cl. ........................ 429/245; 429/233; 429/241; 429/242; 29/2
[58] Field of Search .................................. 429/233, 241, 429/242, 245; 29/29, 2

[56] References Cited

U.S. PATENT DOCUMENTS

| | | | |
|---|---|---|---|
| 4,097,625 | 6/1978 | Lunn et al. | 427/360 |
| 4,140,840 | 2/1979 | Ruben | 429/190 |
| 4,572,870 | 2/1986 | Vasta | 428/416 |
| 4,578,286 | 3/1986 | Vasta | 427/327 |
| 4,589,999 | 5/1986 | Vasta | 252/511 |
| 4,761,356 | 8/1988 | Kobayashi et al. | 429/242 |
| 4,782,585 | 11/1988 | Kobayashi et al. | 29/623.5 |
| 4,805,277 | 2/1989 | Yasuda et al. | 29/2 |
| 4,906,540 | 3/1990 | Hoshihara et al. | 429/242 |
| 4,939,051 | 7/1990 | Yasuda et al. | 429/242 |
| 5,024,908 | 6/1991 | Terada et al. | 429/245 |

OTHER PUBLICATIONS

Takahashi et al, "Techniques to reduce failure in lead–calcium batteries using expanded type grids", Journal of Power Sources, 42 (1993) 221–230. No month available.

*Primary Examiner*—Maria Nuzzolillo
*Assistant Examiner*—Carol Chaney
*Attorney, Agent, or Firm*—Lawrence B. Plant

[57] ABSTRACT

Pb-Ca battery grids are dipped into a bath of molten Pb-Sn or Pb-Ag to prolong the useful life of the battery as determined by the high temperature SAE J240 test.

3 Claims, 2 Drawing Sheets

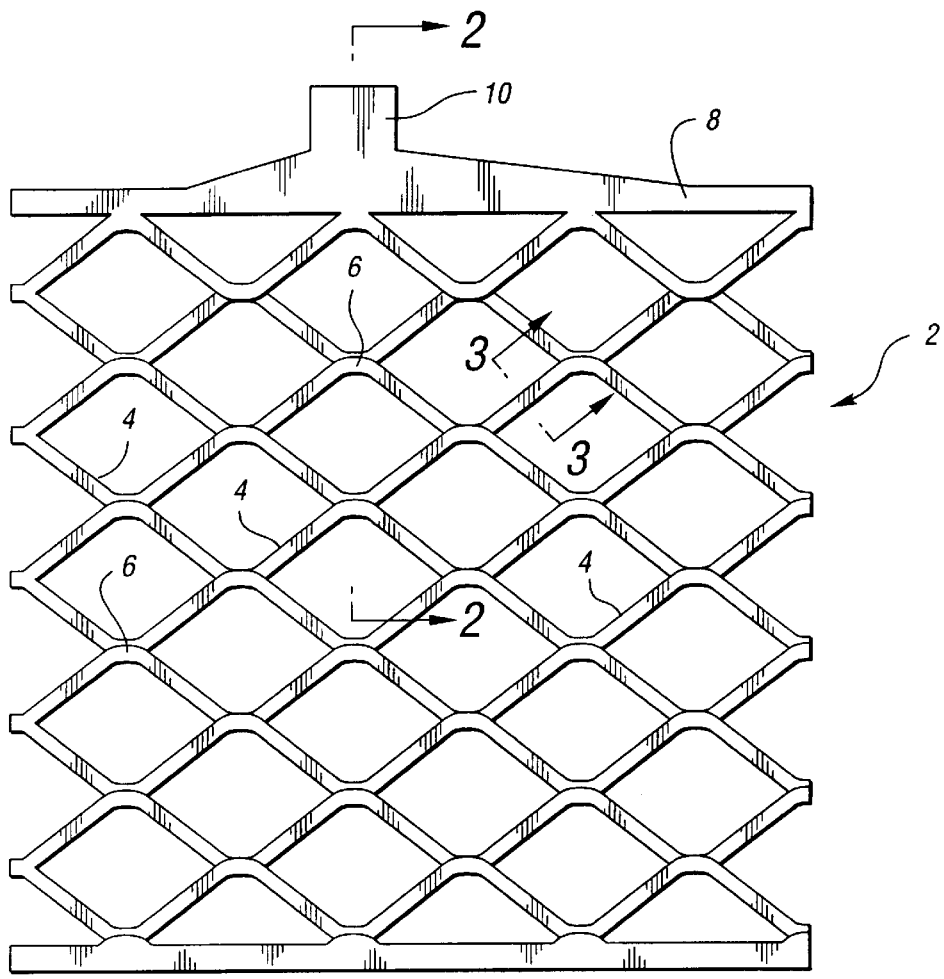
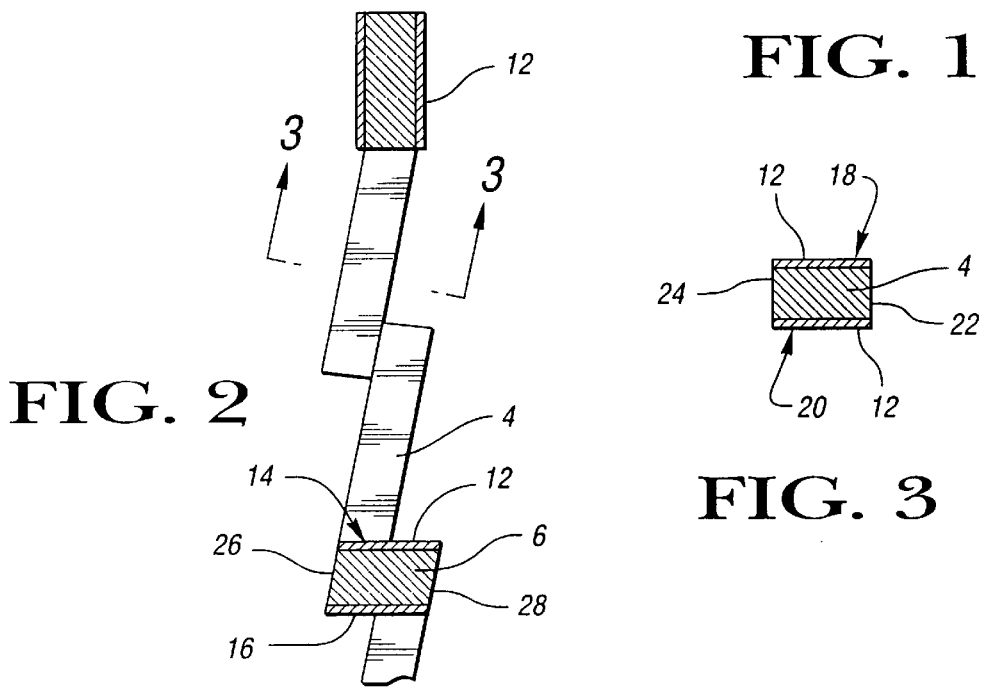
FIG. 1
FIG. 2
FIG. 3

HOT DIPPED PB-CA GRIDS FOR LEAD-ACID BATTERIES

TECHNICAL FIELD

This invention relates to "maintenance-free" lead-acid storage batteries having positive electrodes made from Pb-Ca alloy grids, and more particularly to a method of extending the cycle life of such batteries.

BACKGROUND OF THE INVENTION

Lead-acid storage batteries comprise several cell elements each encased in separate compartments of a container containing sulfuric acid electrolyte. Each cell element comprises at least one positive electrode, at least one negative electrode, and a porous separator (i.e. a thin microporous sheet and/or absorbent glass mat) therebetween. The electrodes each comprise a reticulated lead (including lead alloys) substrate, called a grid, which supports an electrochemically active material thereon, and conducts electrical current throughout the electrode. The active material comprises a leady material (i.e. PbO, $PbO_2$, Pb, or $PbSO_4$ at different charge/discharge stages of the battery) pasted onto the grid.

Many lead-acid batteries are so-called "maintenance-free" batteries which are characterized by having low self discharge, and not requiring the addition of water or other maintenance throughout their lives. Typically, such batteries include grids which are made from lead-calcium alloys that may also contain other alloyants such as tin, strontium, barium, inter alia (see for example Prengaman U.S. Pat. No. 3,953,244, Nees et al. U.S. Pat. No. 4,137,378 and Matter U.S. Pat. No. 4,228,580). As used herein the term lead-calcium alloy is not intended to be limited strictly to such metals, but rather to include other metals and elements as well which are not deleterious to the battery or the maintenance-free character thereof, and are well known to those skilled in the art. The lead-calcium grid alloy may be cast directly into grids, cast into ribbons which are subsequently expanded into grids, or rolled into ribbons in a rolling mill to form wrought alloy ribbons which are subsequently expanded into grids. In one expansion process, a grid-forming ribbon is expanded, in guillotine fashion, by successively advancing the ribbon between slitting and stretching dies such that short interconnected skeletal segments are peeled away from the leading edge of the ribbon to form a tiered structure of polygonal paste retaining cells. Another expansion technique is the dual expansion guillotine type process for making battery grids from Pb-alloy ribbons as disclosed in Daniels et al. U.S. Pat. No. 3,853,626, which is assigned to the assignee of the present invention and incorporated herein by reference.

SLI lead-acid batteries having positive electrodes made from lead-calcium alloy grids are relatively short-lived as determined by the SAE J240B Life Cycle Test (at 40° C. and particularly at 75° C.) owing to corrosion of the grid surface which forms an electrically resistive layer between the active material and the grid and seemingly reduces the adhesion between the active material and the grid over the course of the test. Lead-calcium grid batteries are particularly susceptible to early failure of the high temperature (i.e. 75° C.) J240 test. Deep cycling Pb-Ca grid batteries suffer from the same malady, and are similarly short-lived compared to similar batteries made with Pb-Sb grids.

SUMMARY OF THE INVENTION

The present invention contemplates a method of extending the SAE J240B cycle life (particularly at 75° C.) of a lead-acid storage battery having a positive electrode comprising a current collecting grid embedded in a leady active material, wherein the grid comprises a lead-calcium alloy substrate coated with a layer of metal fused to the surface of the substrates and selected from the group consisting of tin, lead-antimony, lead-silver, and lead-tin alloys. When antimony, tin or silver is oxidized on the surface of the grid, it seemingly promotes better adhesion of the leady active material paste to the grid and enhances the electrical conductivity of the corrosion layer on the surface of the grid. Whatever the mechanism, so coating the Pb-Ca grids significantly extends the lives of the batteries having the coating. Prior to coating, a flux may be applied to the surface of the substrate to clean and remove oxides therefrom. The substrate is then (1) immersed into a melt of the coating alloy to coat the substrate with the coating alloy, (2) removed from the melt, and (3) allowed to cool to solidify the coating. The substrate may be coated after it has been formed into a grid (e.g. as by casting or expanding), but will preferably be coated before it is so formed. In this later regard, the invention is particularly useful for coating ribbons of the substrate alloy which are subsequently formed into expanded grids (i.e. the ribbon is coated with the coating alloy before it is expanded). Such ribbons may be either continuously cast so as to have an as-cast microstructure or may be wrought as a result of having been worked in a rolling mill. The present invention is particularly beneficial in extending the life of grids made from wrought Pb-Ca substrates as immersion of the grid alloy in the coating melt heat treats and recrystallizes the wrought metal, which itself adds a measure of life to the grids and supplements the life-extension benefits of the coating.

BRIEF DESCRIPTION OF THE DRAWINGS

The invention will be better understood when considered in the light of the following detailed description of a preferred embodiment thereof, which is given hereafter in conjunction with the several drawings in which:

FIG. 1 is a front elevational view of a typical expanded grid for a lead-acid storage battery electrode;

FIG. 2 is a section view in the direction 2—2 of FIG. 1;

FIG. 3 is a section view in the direction 3—3 of FIG. 2;

DESCRIPTION OF THE PREFERRED EMBODIMENT

Figure 5:
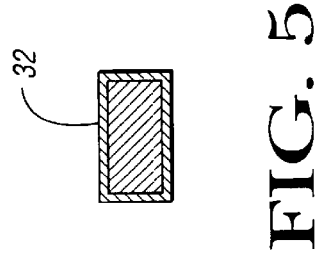
FIG. 5 is a section view in the direction 5—5 of FIG. 4.
Figure 4:
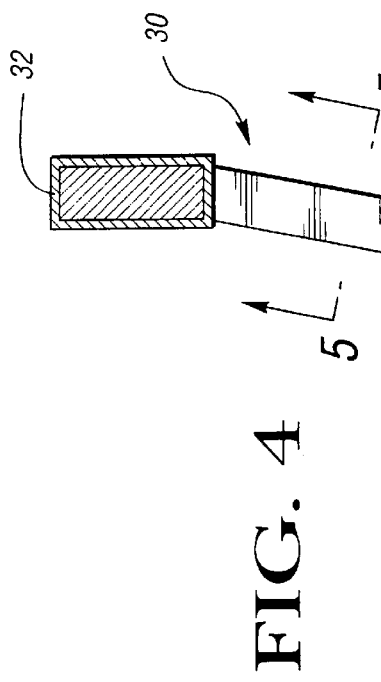
FIG. 4 is a side sectioned view of a portion of an expanded grid coated in accordance with one embodiment of the present invention.

FIG. 1 depicts a typical expanded battery grid 2 comprising a plurality of grid wires 4 interconnected by a plurality of nodes 6 to form a gridwork for supporting the electrodes active material. The grid depicted is for a flat-plate-type battery, though the invention is not limited thereto. Rather the invention is equally applicable continuous grid strips such as are used in the manufacture of jelly-roll-type circular batteries, well known to those skilled in the art. A border 8 extends along the top of the gridwork for collecting current therefrom and directing it to a lug 10 which projects from the border for electrically connecting the electrode 2 to other electrodes of like polarity in the battery. In the preferred embodiment shown in FIGS. 1, 2 and 3, a Sn, Pb-Sn, Pb-Sn or Pb-Ag coating 12, formed in accordance with the present invention, is shown on opposing faces 14 and 16 of the nodes 6 and opposing faces 18 and 20 of the grid wire 4. In this embodiment, the lead-calcium ribbon from which the grid 2 was made was coated with the coating metal layer before it was expanded to form the grid 2. As a result, the opposing faces 22 and 24 of the gridwires 4, and opposing faces 26 and 28 of the nodes 6 where shearing occurred in the expansion process, are left bare and uncovered by the coating. FIGS. 4 and 5, on the other hand, depict a grid 30 having a coating 32 applied thereto after expansion such that the coating 32 covers all exposed faces of the grid. It is much easier to coat the substrate ribbon prior to expansion than after expansion, and J240 tests have shown that it makes little difference in terms of the battery's life.

Figure 6:
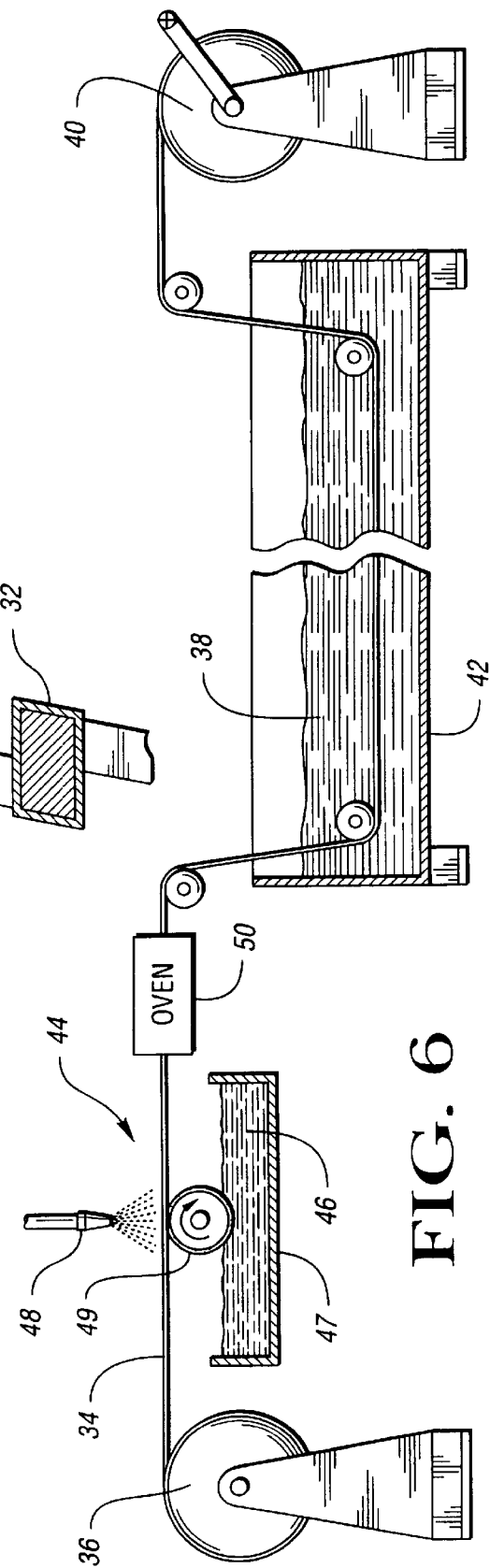
FIG. 6 is a partially sectioned side elevational view of an apparatus for coating grids in accordance with the process of the present invention.

The grids may be immersed in molten Pb-Sb or Pb-Ag melts individually by a simple dipping process, or preferably, by drawing a continuous length of unexpanded ribbon, or preexpanded grid strip, through a bath of the melt as depicted in FIG. 6. In this regard, a coil of ribbon or strip 34 is fed from a supply reel 36 through a bath 38 of molten coating alloy and unto a take-up reel 40 spaced sufficiently downstream from the bath 38 to permit solidification and cooling of the coating before recoiling. Alternatively, the coating step could immediately precede the pasting operation in the battery assembly plant and thereby eliminate the recoiling step. The length of the tank 42 containing the bath 38 will vary with the composition of the coating alloy, the temperature of the coating alloy, the thickness of coating sought to be deposited and the rate at which the ribbon/strip 34 moves through the bath 38. A fluxing station 44 will preferably, though not necessarily, be provided at the entrance to the coating tank 42, and includes (1) a pool 46 of flux in a tray 47 underlying the advancing ribbon/strip 34, (2) a rotating roller 49 that absorbs and picks up flux form the pool 46 and applies it to the underside of the ribbon 34, and (3) a nozzle 48 overlying the ribbon/strip 34 for spraying flux onto the topside of the ribbon/strip 34. Other techniques , e.g. wetted sponges/applicators, for applying the flux to the ribbon/strip 34 may also be used without departing from the present invention. An oven or air-blast station 50 will preferably be inserted between the fluxing station 44 and the coating tank 42 to dry the flux before the ribbon/strip enters the melt 38 to prevent boiling off of the flux solvent in the melt. When an oven is used, the ribbon/strip 34 is preheated before it enters the melt 38, which reduces the chilling effect of a cold ribbon/strip entering the melt and is believed helpful to promoting a better metallurgical bond between the coating and the substrate. Whether individual grids are dipped into a melt or continuous ribbons/strips are drawn continuously through a pool of melt, the resulting microstructure of the coating is that of an unstressed, as-cast material which has a coarse surface that is desirable for good interfacial contact and mechanical bonding with the electrode's leady active materials.

The present invention is applicable to any of the cast or wrought lead-calcium alloys commonly used to manufacture battery grids wherein the calcium content typically varies, by weight, from about 0.02% to about 0.15%. Such lead-calcium alloys may also include other alloyants such as (1) strontium in the range of about 0.02% to about 0.3%, or (2) barium in the range of about 0.02% to about 0.62%. The present invention is particularly advantageous for use with wrought alloys (e.g. calcium about 0.08%, and tin about 1.5%, as the heat from the coating melt causes recrystallation of the wrought lead-calcium alloy which alone, and without the coating of the present invention, has proven beneficial in extending the high temperature J240 life of the grids.

The thickness of the coating of the present invention is not particularly critical. Rather, a thickness of only about 1 $\mu$m is seen to be effective to significantly extend the lives of electrodes made from grids coated in accordance with the present invention. Greater thicknesses are also effective, but are not seen to be necessary for surviving 3000 J240 (@75° C.) cycles over a seven week period as is required by some battery purchasers. In fact, it is believed that any unnecessary thickness of lead-antimony alloys will tend to detract from the maintenance-free character of the batteries by promoting increased gassing and water consumption therein. Unnecessary silver will likely cause a similar result. Successful tests conducted with coating thicknesses varying from about 4 $\mu$m to about 10 $\mu$m show little difference in life.

Suitable coatings comprise tin and lead-tin, lead-antimony or lead-silver alloys. The precise composition of the coating is not particularly critical in terms of extending he lives of batteries. On the other hand, there are two general rules applicable to the selection of the coating composition. First, the composition of the coating should be selected so as to provide a melt having a melting point which is sufficiently less than the melting point of the lead-calcium substrate as to preclude complete melting of the substrate while it is immersed in the melt. Melting of the surface of the lead-calcium substrate is acceptable and, in fact, desirable to promote metallurgical bonding of the coating to the substrate. Second, the composition of the coating should be such that there is sufficient tin, antimony or silver present to dope the corrosion layer on the surface of the substrate (i.e. at the grid-active material interface) with oxides of the tin, anatomy or silver, and thereby improve the conductivity of the corrosion layer and promote better adhesion of the leady active material to the grid. Suitable lead-antimony alloys for this purpose will include alloys having an antimony content varying from about 1%, by weight, to about 20% by weight. Other additives such as tin (i.e., up to about 2%), selenium (up to about 2%), and bismuth (up to about 0.2%), inter alia, may also be used with the antimonial lead. Hence, the term lead-antimony alloy is not intended to be limited to alloys containing just lead and antimony, but rather is intended to include other low melting alloys thereof which do not negate the intended effects of the antimony or are otherwise deleterious to a battery. For coating wrought Pb-Ca-Sn substrate alloys (i.e., 0.08% Ca, and 1.5% Sn) which melt at about 610° F., the antimony content will preferably be between about 3% and about 12%, and most preferably will be about 5% to 6%, by weight so as to have a melting point of about 590° F. Similarly, suitable lead-silver alloys will include alloys having a silver content up to about 3%, and preferably about 2.3% by weight (i.e. eutectic melting at about 579° F.) for wrought Pb-Ca-Sn substrate alloys. Other alloyants could also be added, up to 2% tin, inter alia. Hence, the term lead-silver alloy is not intended to be limited to alloys containing just lead and silver, but rather intended to include other low melting alloys thereof which do not negate the intended effects of the silver or are otherwise deleterious to a battery or to the maintenance-free character thereof. Finally, tin or lead-tin alloys may be used as all melt at lower temperatures than the lead-calcium substrates. Lead-tin alloys will preferably comprise about 0.1% to about 20% tin, but otherwise will be determined primarily on the basis of cost owing to the high cost of tin. Other alloyants that could be added include up to 0.2% bismuth, and up to 2% selenium, inter alia. Hence, the term lead-tin alloy is not intended to be limited to alloys containing just lead and tin, but rather intended to include other low melting alloys thereof which do not negate the intended effects of the tin or are otherwise deleterious to a battery or the maintenance-free character thereof.

The precise temperature of the melt is not particularly critical so long as it is not so hot as to completely melt the substrate in the brief time that it is immersed in the melt. Hence, the melt temperature will, in many respects, be determined by the composition (and hence melting point) of the substrate being coated. Generally speaking, it is preferred that the temperature of the melt be maintained at a temperature that is at least about 20° F. below the melting point of the substrate. On the other hand, it is desirable that the temperature be sufficiently high as to melt some low melting phases on the surface of the substrate to promote better bonding of the coating to the substrate.

When used, virtually any flux commonly used to weld or solder lead alloys is acceptable for cleaning and deoxidizing the substrate. Hence fluxes such as phosphoric acid, azelic acid, and oxalic acid are seen to be useful. A preferred flux comprises a solution of zinc chloride in hydrochloric acid marketed as a soldering flux by the J. W. Harris Co. Inc. (Cincinnati, Ohio).

Testing

Test A —Initially, coating tests were conducted to determine if, in fact, Pb-Ca-Sn ribbons and strips could be effectively coated by the hot dip technique of the present invention. Unexpanded ribbons and expanded grids of wrought Pb-Ca-Sn (i.e., 0.08% Ca, and 1.5% Sn) were hand dipped into a pot of molten Pb-Sb coating alloy comprising 5.7% by weight antimony. The grids and ribbons were 0.052 inch thick and were wire brushed prior to fluxing in the aforesaid Harris zinc chloride flux. The coating melt was maintained at a temperature of 590° F., and the ribbons/grids were dipped slowly into the melt until they bottomed out in the pot and then slowly withdrawn at the same rate for a total immersion time of about 2seconds. Prior to complete solidification of the coating, the ribbons/grids were struck with a steel rod to remove any excess melt adhering to the grids/ribbons. The coating was uniform with no excess buildup on the grid wires or the edges of the grids/ribbons.

Thereafter a variety of tests were conducted to evaluate the high temperature SAE J240 cycle life of batteries made from positive electrodes made from coated, uncoated, heat treated and unheat treated grids.

Test B - To quantify heat treatment effect on wrought Pb-Ca alloy, J240 tests were performed at 75° C. on several 0.042 inch thick samples of a wrought lead-calcium alloy comprising 0.8% Ca., and 1.5% Sn. Some of the grid samples were pasted without any heat treatment or coating, while others were pasted after heat treatment (sans coating) wherein the grids were wrapped in aluminum foil (i.e. to prevent coating) and dipped for about 10 seconds into a lead-antimony (i.e. 3% Sb.) melt held at a temperature of 600° F. which caused the wrought alloy to recrystallize. Following dipping and cooling, the aluminum foil was removed and the grids pasted in the same manner as the first samples. Test cells having 5 positive and 4 negative plates were constructed and tested. The cells made from the uncoated and unrecrystallized grids survived 4.0 weeks in the high temperature J240 tests, while cells made from the uncoated, recrystallized samples survived 5.8 weeks in such tests. Similar tests were conducted on cells made from grids which were both coated with Pb-Sb alloy and recrystallized. The grids were expanded from a hot-dip-coated ribbon of the same thickness. Those cells have survived from 12 to 15 weeks. Each week of testing corresponds to 428 complete charge/discharge cycles of the cell.

Test C - A 0.052 inch thick ribbon of wrought 0.08% Ca. and 1.5% Sn alloy was dipped for about 1second in a 600° F. melt of lead-antimony comprising 5.67% by weight Sb to coat the ribbon with the melt. Following solidification of the coating, the ribbon was expanded into a strip of positive grids having a 0.60 inch grid multiple. The strip was cut into individual grids which were hand pasted into plates with a leady active material paste comprising 12% lead sulfate and 0.14 pounds of water per pound of oxide in the paste. Each grid was 4% heavier than the uncoated grids used in the control cells. Two test cells were made up comprising 7 of the aforesaid positive plates and 6 negative plates separated by a microporous polyethylene separator. The first cell failed in the 12th week (i.e. lasted more than 11 weeks) and the second cell failed in the 14th week (i.e. lasted more than 13 weeks) of the high temperature J240 test for an average of about 12 weeks. Control cells were constructed the same way as the test cells except that they used positive grids which were not hot-dipped (i.e. not Pb-Sb coated or recrystallized). Five control cells were constructed and tested, as above. Four of the control cells failed in the ninth week and one in the 10th week for an average of 8.2 full weeks.

Test D - Grids were made from the same ribbon as described in Test C except they were dipped in the lead-antimony melt (i.e. 1 second at 600° F. - 5.67% Sb) after expansion rather before such that all four sides of each gridwire was coated (see FIG. 5) with the Pb-Sb. The grids so made were 10% heavier than the uncoated grids used in the control cells. The grids were pasted with a leady paste having 6% $PbSO_4$ and 0.14 pounds of water per pound of oxide in the paste which is quite similar to that of Test C. Three test cells were constructed and tested as described in Test C. One cell failed in the 10th week (i.e. lasted more than 9 full weeks) and the other two cells failed in the 9th week (i.e. lasted more than 8 full weeks) for an average of 8.3 weeks. Three control cells were made with uncoated and unrecrystallized positive grids, but otherwise the same as the test cells. Two of the control cells failed in the 7th week (i.e. survived more than 6 full weeks) and the other control cell failed in the 6th week (i.e. survived more than 5 full weeks) for an average of 5.7 weeks.

Test E - Grids were made from a wrought 0.052 inch thick, 0.08% Ca - 1.5% Sn, ribbon as described in Test C except they were dipped in the lead-antimony melt (i.e. 1 second at 600° F. - 5.67% Sb) after expansion. The grids weighed 42% more than the control grids due to bridging of the melt between the gridwires. Thickness was 0.054 inches or 5% over the uncoated controls. The grids were pasted with 6% $PbSO_4$ paste as above. Cells were constructed from 5 positive plates and 4 negative plates. Five control cells were made and tested in the same manner as the test cells but with uncoated and unrecrystallized positive grids. The five control cells survived 4 complete weeks and failed in the 5th week for an average of 4.0 weeks. The five test cells have survived 9 full weeks of testing so far and continue to survive.

Test F - A 0.042 inch thick ribbon of wrought 0.08% Ca and 1.5% Sn alloy was dipped for about 1 second in a 600° F. melt of lead-antimony comprising 5.67% by weight Sb to coat the ribbon with the melt. Following solidification of the coating, the ribbon was expanded into a strip of positive grids which were pasted with a 6% $PbSO_4$ active material, as above. The grids weighed 5% more than the uncoated controls and had a thickness of 5% more than the controls.

Five test cells were made having 5 positive and 4 negative plates per cell. One of the cells has already demonstrated a J240 life of 12 weeks and continues on test. Two of the cells have already demonstrated a life of 14 weeks and continue on test. Two other test cells have already demonstrated a life of 15 weeks and continue on test.

While the invention has been disclosed in terms of certain specific embodiments thereof it is not intended to be limited thereto but rather only to the extent set forth hereafter in the claims which follow.

I claim:

1. A method of extending the high temperature cycle life of a lead-acid storage battery having a positive electrode comprising a leady active material embedding a current collecting grid comprising a lead-calcium alloy, comprising the steps of:

forming a strip of said lead-calcium alloy;

immersing said strip into a melt of a molten coating alloy selected from the group consisting of lead-antimony lead-silver alloys for a time sufficient for said coating alloy to coat and rise to the surface of said strip without completely melting said lead-calcium alloy;

removing the coated strip from said melt; and cooling the coated strip to solidify said coating on said surface.

2. A method of extending the high temperature cycle life of a lead-acid storage battery having a positive electrode comprising a leady active material embedding a current collecting grid comprising a lead-calcium alloy, comprising the steps of:

forming a ribbon of grid substrate material comprising said lead-calcium alloy, immersing said lead-calcium ribbon into a melt of a molten coating alloy selected from the group consisting of lead-antimony and lead-silver alloys for a time sufficient for said coating alloy to coat and fuse to the surface of said ribbon without completely melting said lead-calcium alloy;

removing the coated ribbon from said melt;

cooling the coated ribbon to solidify said coating alloy on said surface; and expanding the coated ribbon into a grid-forming strip comprising a network of grid wires and nodes interconnecting adjacent said grid wires.

3. A method of extending the high temperature cycle life of a lead-acid storage battery having a positive electrode comprising a leady active material embedding a current collecting grid comprising a lead-calcium alloy, comprising the steps of:

rolling a grid substrate material comprising an alloy of lead, calcium and tin to form a wrought ribbon of said material;

immersing said ribbon into a melt of a molten coating alloy selected from the group consisting of lead antimony and lead-silver alloys for a time sufficient (1) to coat said ribbon with said coating alloy, and (2) to fuse said coating alloy to said surface without completely melting said ribbon;

removing the coated ribbon from said melt;

cooling the coated ribbon to solidify said coating alloy on said surface; and expanding said ribbon into a grid-forming strip comprising a network of grid wires and nodes interconnecting adjacent said grid wires whereby said wrought ribbon is metallurgically recrystallized while in said melt to supplement the cycle-life improving benefits of the coating alloy.

* * * * *